United States Patent
Judd et al.

(10) Patent No.: US 12,493,624 B2
(45) Date of Patent: Dec. 9, 2025

(54) SURFACING LIVE EVENTS IN SEARCH RESULTS

(71) Applicant: Google LLC, Mountain View, CA (US)

(72) Inventors: Tilke Mary Judd, Zurich (CH); Zaheed Sabur, Zurich (CH); Eduardo Jodas Samper, Zurich (CH); Alexandru Ovidiu Dovlecel, Zurich (CH); Ardan Arac, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/743,820

(22) Filed: Jun. 14, 2024

(65) Prior Publication Data

US 2024/0411771 A1 Dec. 12, 2024

Related U.S. Application Data

(63) Continuation of application No. 17/144,898, filed on Jan. 8, 2021, now Pat. No. 12,045,248, which is a
(Continued)

(51) Int. Cl.
G06F 17/00 (2019.01)
G06F 7/00 (2006.01)
(Continued)

(52) U.S. Cl.
CPC ...... *G06F 16/248* (2019.01); *G06F 16/24578* (2019.01); *G06F 16/951* (2019.01)

(58) Field of Classification Search
CPC . G06F 16/248; G06F 16/24578; G06F 16/951
(Continued)

(56) References Cited

U.S. PATENT DOCUMENTS 7,065,778 B1 6/2006 Lu
7,720,836 B2 5/2010 Abajian et al.
(Continued)

FOREIGN PATENT DOCUMENTS

CN 103092958 5/2013
JP 2001/282730 10/2001
(Continued)

OTHER PUBLICATIONS

CN Office Action in Chinese Application No. 201580032623.X, dated Sep. 25, 2019, 23 pages.
(Continued)

*Primary Examiner* — Pavan Mamillapalli
(74) *Attorney, Agent, or Firm* — DORITY & MANNING P.A.

(57) ABSTRACT

Implementations include actions of obtaining a set of entities based on one or more terms of a query, obtaining one or more entities associated with each live event of a plurality of live events, identifying a live event that is responsive to the query based on comparing at least one entity in the set of entities to one or more entities associated with each live event of a plurality of live events, determining that an event search result corresponding to the live event is to be displayed in search results, and in response: providing the event search result for display, the event search result including information associated with the live event, the information including an indicator of an occurrence of the live event.

20 Claims, 5 Drawing Sheets

Related U.S. Application Data continuation of application No. 16/806,682, filed on Mar. 2, 2020, now Pat. No. 10,929,416, which is a continuation of application No. 15/313,281, filed as application No. PCT/US2015/034712 on Jun. 8, 2015, now Pat. No. 10,621,191.

(60) Provisional application No. 62/012,480, filed on Jun. 16, 2014.

(51) Int. Cl.
*G06F 16/2457* (2019.01)
*G06F 16/248* (2019.01)
*G06F 16/951* (2019.01)

(58) Field of Classification Search
USPC .......................................................... 707/725
See application file for complete search history.

(56) References Cited

U.S. PATENT DOCUMENTS

| | | | |
|---|---|---|---|
| 8,412,727 B1* | 4/2013 | Das | G06F 16/2457 707/767 |
| 9,286,397 B1* | 3/2016 | Suleman | G06F 16/9538 |
| 10,621,191 B2 | 4/2020 | Judd et al. | |
| 10,929,416 B2 | 2/2021 | Judd et al. | |
| 11,017,057 B1 | 5/2021 | Arazi | |
| 2004/0001104 A1* | 1/2004 | Sommerer | G06F 16/957 707/E17.119 |
| 2004/0032495 A1* | 2/2004 | Ortiz | H04L 69/329 348/42 |
| 2007/0124259 A1 | 5/2007 | Sussman et al. | |
| 2007/0239675 A1 | 10/2007 | Ragno et al. | |
| 2008/0021874 A1 | 1/2008 | Ilechko et al. | |
| 2008/0077505 A1 | 3/2008 | Ilechko et al. | |
| 2008/0162211 A1 | 7/2008 | Addington | |
| 2008/0282293 A1 | 11/2008 | Frechter et al. | |
| 2009/0089294 A1* | 4/2009 | Davis | H04N 21/475 |
| 2009/0089352 A1* | 4/2009 | Davis | G06F 3/0482 709/201 |
| 2010/0031193 A1 | 2/2010 | Stark et al. | |
| 2010/0101982 A1 | 4/2010 | Konishi et al. | |
| 2010/0235351 A1 | 9/2010 | Iwasa et al. | |
| 2010/0250370 A1 | 9/2010 | Jones et al. | |
| 2010/0257164 A1 | 10/2010 | Halverson et al. | |
| 2011/0040656 A1 | 2/2011 | Groetzinger et al. | |
| 2011/0047146 A1 | 2/2011 | Scott | |
| 2011/0191364 A1* | 8/2011 | LeBeau | G06F 16/3338 707/E17.014 |
| 2011/0218864 A1 | 9/2011 | Pentz et al. | |
| 2011/0289422 A1 | 11/2011 | Spivack et al. | |
| 2011/0296463 A1 | 12/2011 | Suslov | |
| 2011/0307483 A1* | 12/2011 | Radlinski | G06F 16/24578 707/E17.084 |
| 2012/0101982 A1 | 4/2012 | Gray et al. | |
| 2012/0123811 A1 | 5/2012 | Socolof et al. | |
| 2013/0073582 A1 | 3/2013 | Krishnamoorthy | |
| 2013/0096981 A1 | 4/2013 | Evans et al. | |
| 2013/0110825 A1 | 5/2013 | Henry | |
| 2013/0166546 A1* | 6/2013 | Shen | G06F 16/24578 707/723 |
| 2013/0305980 A1 | 11/2013 | Park et al. | |
| 2014/0006129 A1 | 1/2014 | Heath | |
| 2014/0040414 A1 | 2/2014 | Ronchi et al. | |
| 2014/0188862 A1 | 7/2014 | Campbell et al. | |
| 2015/0058324 A1 | 2/2015 | Kauwe | |
| 2015/0112963 A1 | 4/2015 | Mojtahedi et al. | |
| 2015/0149482 A1* | 5/2015 | Finkelstein | G06F 16/3338 707/748 |
| 2015/0161663 A1 | 6/2015 | Klein et al. | |
| 2015/0278355 A1 | 10/2015 | Hassanpour et al. | |
| 2016/0350721 A1 | 12/2016 | Comerford et al. | |
| 2017/0039269 A1 | 2/2017 | Raff et al. | |

FOREIGN PATENT DOCUMENTS

| | | |
|---|---|---|
| JP | 2002/199377 | 7/2002 |
| JP | 2004/350092 | 12/2004 |
| JP | 2007/328496 | 12/2007 |
| JP | 2011/103522 | 5/2011 |
| JP | 2013/126190 | 6/2013 |
| WO | WO 2009/104387 | 8/2009 |

OTHER PUBLICATIONS

CN Office Action in Chinese Application No. 201580032623.X, dated Feb. 25, 2020, 6 pages.

IN Office Action in Indian Application No. 201647044766, dated Jun. 25, 2020, 6 pages.

International Preliminary Report on Patentability in International Application No. PCT/US2015/034712, Dated Dec. 20, 2016, 7 pages.

International Search Report and Written Opinion in International Application No. PCT/US2015/034712, Dated Sep. 21, 2015, 10 pages.

* cited by examiner

SURFACING LIVE EVENTS IN SEARCH RESULTS

CROSS-REFERENCE TO RELATED APPLICATIONS

This application is a continuation of, and claims priority to, U.S. patent application Ser. No. 17/144,898, filed on Jan. 8, 2021, which is a continuation application of, and claims priority to, U.S. patent application Ser. No. 16/806,682, filed on Mar. 2, 2020, which is a continuation application of, and claims priority to, U.S. patent application Ser. No. 15/313,281, now U.S. Pat. No. 10,621,191, filed on Nov. 22, 2016, which application claims priority to International Application No. PCT/US2015/034712 filed on Jun. 8, 2015, which claims the benefit of U.S. Provisional Application No. 62/012,480 filed on Jun. 16, 2014. Applicant claims priority to and the benefit of each of such applications and incorporates all such applications herein by reference in their entirety.

BACKGROUND

The Internet provides access to a wide variety of resources, such as image files, audio files, video files, and web pages. A search system can identify resources in response to queries submitted by users and provide information about the resources in a manner that is useful to the users. The users can navigate through, e.g., select, search results to acquire information of interest.

SUMMARY

This specification relates to surfacing live events in search results.

Implementations of the present disclosure are generally directed to selectively surfacing live events in search. More particularly, implementations of the present disclosure are directed to identifying live events, and selectively providing graphical representations of live events in search results.

In general, innovative aspects of the subject matter described in this specification can be embodied in methods that include actions of obtaining a set of entities based on one or more terms of a query, obtaining one or more entities associated with each live event of a plurality of live events, identifying a live event that is responsive to the query based on comparing at least one entity in the set of entities to one or more entities associated with each live event of a plurality of live events, determining that an event search result corresponding to the live event is to be displayed in search results, and in response: providing the event search result for display, the event search result including information associated with the live event, the information including an indicator of an occurrence of the live event.

Innovative aspects of the subject matter described in this specification can also be embodied in methods that include actions of receiving a set of live events from one or more sources, determining a quality score for each live event in the set of live events, determining that the quality score of a live event exceeds a threshold quality score, and in response, including the live event in a sub-set of live events, and selectively providing an event search result for display to a user in search results based on one or more live events in the sub-set of live events.

Other implementations of these aspects include corresponding systems, apparatus, and computer programs, configured to perform the actions of the methods, encoded on computer storage devices.

These and other implementations can each optionally include one or more of the following features: determining that an event search result corresponding to the live event is to be displayed in search results includes: determining that the occurrence of the live event is within a threshold period of time after the query is received; the indicator indicates that the live event is occurring concurrently with display of the search results; the indicator indicates a time, at which the live event is scheduled to occur; the threshold period of time is determined based on an indication of an intent of the query; if the intent indicates intent to search for a live event, the threshold time period is set to a first value, and if the intent does not indicate intent to search for a live event, the threshold time period is set to a second value that is less than the first value; determining that an event search result corresponding to the live event is to be displayed in search results includes: determining that a factual summary associated with the at least one entity is to be displayed in search results; providing an event search result includes transmitting a search results document that includes instructions to display one or more general search results and the event search result; actions further include receiving the query from the user.

Particular implementations of the subject matter described in this specification can be implemented so as to realize one or more of the following advantages. In some examples, live events that may be relevant to the user and/or that may be what the user is searching for are surfaced in search results. In this manner, the user is not required to submit one or more additional queries to find information associated with live events. This reduces the number of queries submitted to a search system and responses from the search system, for example, thereby reducing demand on system resources, e.g., memory, processors, and increasing available bandwidth.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to selectively surfacing live events in search. More particularly, implementations of the present disclosure are directed to identifying live events, and selectively providing graphical representations of live events in search results. In some implementations, a live event index is provided and includes live events that are determined to be of sufficient quality for surfacing in search results. In some implementations, one or more live events can be provided from the live event index in response to a query, and live event search results corresponding to the one or more live events can be displayed in search results.

Figure 1:
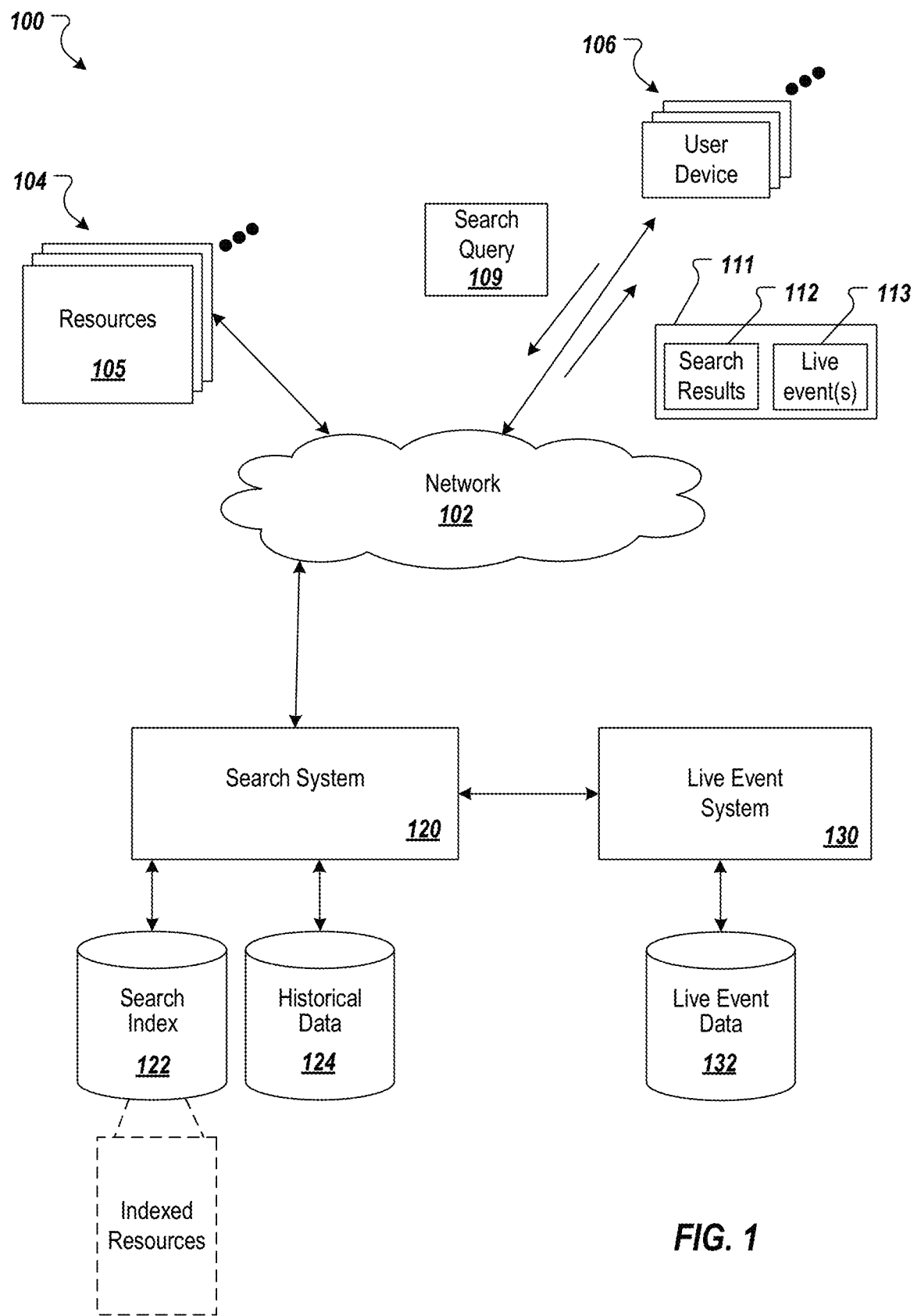
FIG. 1 depicts an example environment in which a search system provides search results.

FIG. 1 depicts an example environment 100 in which a search system provides search results. In some examples, the example environment 100 enables users to interact with one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In the example of FIG. 1, a search system 120 is depicted, which provides a search service, as described in further detail herein.

With continued reference to FIG. 1, the example environment 100 includes a network 102, e.g., a local area network (LAN), wide area network (WAN), the Internet, or a combination thereof, that connects web sites 104, user devices 106, and the search system 120. In some examples, the network 102 can be accessed over a wired and/or a wireless communications link. For example, mobile computing devices, such as smartphones, can utilize a cellular network to access the network 102. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain content. Example content includes text, images, multimedia content, and programming elements, e.g., scripts. Each web site 104 is maintained by a publisher, e.g., an entity that manages and/or owns the web site.

In some examples, a resource 105 is data provided over the network 102 and is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is capable of requesting and receiving resources 105 over the network 102. Example user devices 106 include personal computers, laptop computers, and mobile computing devices, e.g., smartphones and/or tablet computing devices, that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 can execute a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105, and returns the search results display 111 to the user devices 106. The search results 112 include general search results that are responsive to the query. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and a uniform resource locator (URL) of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer. The selection data can also include, for each selection of a search result 112, data identifying the search query 109 for which the search result 112 was provided.

In accordance with implementations of the present disclosure, the example environment 100 also includes a live event system 130 communicably coupled to the search system 120, e.g., directly coupled or coupled over a network such as network 102. Although the search system 120 and the live event system 130 are depicted as separate systems in FIG. 1, it is contemplated that the search system 120 can include the live event system 130. In some implementations, the live event system 130 identifies content published by one or more web sites, which qualify as live events that are to be selectively surfaced in search results, as described in further detail herein. In some examples, the live event system 130 stored event data associated with select live events in a live event datastore 132. The live event system 130 identifies one or more live event that may be relevant to the search query 109 and that are ripe for display based on data stored in the live event datastore 132. In some examples, the live event system 132 determines whether one or more live events are to be displayed in the search results display and, if so, identifies one or more live events that are to be represented in the search results display 111 based on data provided in the live event datastore 132. In some examples, the search results display 111 includes search results 112 identifying resources 105, and live event search results 113, which search results display 111 is provided to the user devices 106. The live event search results 113 include graphical representations of one or more live events.

Implementations of the present disclosure are generally directed to selectively surfacing live events in search. More particularly, implementations of the present disclosure are directed to identifying live events, and selectively providing graphical representations of live events in search results. In some implementations, a set of live events is provided from a superset of live events. In some examples, the set of live events includes live events that can be selectively surfaced in search results. In some examples, a quality score is determined for each live event in the superset of live events, and live events are included in the set of live events based on respective quality scores. In some implementations, one or more live event search results are provided in search results in response to a query. In some examples, one or more live events are selected for inclusion in search results based on one or more entities in common between a query and a live event in the set of live events.

In some implementations, a live event includes content that is to be streamed live to and is viewable in one or more resources, e.g., web pages, on a specified day and at a specified time. In some examples, content includes audio and/or video. In some examples, the content is streamed live to one or more web pages of one or more computer-implemented services. For example, a live event can be provided as a video that is streamed live and is viewable on a web page of a computer-implemented video sharing service. As another example, a live event can be provided as a live video chat session that is viewable on a web page of a computer-implemented social networking service, or a computer-implemented chat service.

In some implementations, a superset of live events is provided. In some examples, the superset of live events includes live events of one or more computer-implemented services. An example live event can include a State of the Union address by the President of the United States, which is to be streamed for live viewing on one or more resources, e.g., a web page of www.whitehouse.gov, on a particular data and time. Another example live event can include a show hosted by a user from the user's home, which is to be streamed for live viewing on one or more computer-implemented services, e.g., a video sharing service, on a particular data and time. In some examples, a live event is associated with at least one computer-implemented service, e.g., the live event is scheduled to occur on and be viewable through at least one computer-implemented service. For example, a first live event can be scheduled on a first computer-implemented service, e.g., a video sharing service, and a second live event can be scheduled on a second computer-implemented service, e.g., a chat service. The first live event and the second live event can both be included in the superset of live events.

In some implementations, each live event in the superset of live events includes respective event data. Example event data can include an organizer of the live event, one or more entities associated with the live event, a description of the live event, a time of the live event, a date of the live event, and a URL of a resource, through which the live event will be published. In some examples, the organizer of the live event includes a user that schedules the live event with a respective computer-implemented service. In some examples, the user includes a user that is registered with the computer-implemented service, e.g., has a profile and/or credentials established with the computer-implemented service. For example, the organizer can log into the computer-implemented service and can schedule the live event, e.g., input a description of the live event, a time of the live event, and a date of the live event. In general, the term "entity" can refer to something that is a discrete unit, for example, a person, place, thing, or idea that can be associated with an event. In some examples, the one or more entities associated with the live event can include one or more people, brands, companies, universities, colleges, non-profit organizations, governmental agencies, and the like. For example, a company that is sponsoring the live event can be included in the one or more entities associated with the live event.

In some examples, a set of entities for a live event can be provided based on structured data. For example, a plurality of entities and information associated therewith can be stored as structured data in an entity graph. In some examples, an entity graph includes a plurality of nodes and edges between nodes. In some examples, a node represents an entity and an edge represents a relationship between entities. In some examples, the entity graph can be provided based on an example schema that structures data based on domains, types and properties. In some examples, a domain includes one or more types that share a namespace. In some examples, a namespace is provided as a directory of uniquely named objects, where each object in the namespace has a unique name, e.g., identifier. In some examples, a type denotes an "is a" relationship about a topic, and is used to hold a collection of properties. In some examples, a topic represents an entity, such as a person, place or thing. In some examples, each topic can have one or more types associated therewith. In some examples, a property is associated with a topic and defines a "has a" relationship between the topic and a value of the property. In some examples, the value of the property can include another topic. In some examples, data associated with a live event is provided to an entity annotator that selects one or more entities from an entity graph, and the one or more entities are included in the set of entities associated with the live event.

In some implementations, the event data is processed for each live event in the superset of live events to provide a respective quality score. In some examples, the quality score reflects a degree of quality of the live event, and is based on the event data, e.g., the organizer, the one or more entities associated with the event. For example, a State of the Union address by the President of the United States can have a relatively high quality score, while a show hosted by a user from the user's home can have a relatively low quality score.

In some implementations, the quality score of a live event is determined based on one or more sub-scores. Example sub-scores can include an organizer score, one or more entity scores, and a description score. In some examples, the organizer score is determined as an average of the one or more sub-scores. In some examples, the organizer score is determined as a weighted average of the one or more sub-scores. For example, respective weights can be applied to respective sub-scores. In this manner, respective scores can influence the quality score based on respective weights. For example, the organizer score can be weighted more heavily than the description score, such that the organizer score provides a greater contribution to the quality score than does the description score.

In some examples, the organizer score is specific to the organizer of the event, and can be based on information associated with the organizer. Example information can include a number of quality live events organized by the organizer and/or a number of followers that the organizer has within one or more computer-implemented services. In some examples, the organizer score can be determined at least partially based on the number of quality live events organized by the organizer, and/or at least partially based on the number of followers that the organizer has.

For example, a set of live events organized by the organizer can be provided and can include respective quality scores. In some examples, if the quality score of a live event exceeds a threshold quality score, the live event is designated as a quality live event. In some examples, if the organizer has organized no other live events (other than the current live event, for which a quality score is being determined), or the organizer has organized no quality live events, the organizer score can be set to a minimum value, e.g., 0. In some examples, if the organizer has organized at least a threshold number of quality live events, the organizer score can be set to a maximum value, e.g., 1. In some examples, the organizer score can be set to a value between the minimum value and the maximum value based on the number of quality live events that the organizer has scheduled.

As another example, one or more users of a computer-implemented service can be so-called followers of the organizer within respective computer-implemented services. In some examples, a follower is a user that has elected to automatically receive information associated with another user within a computer-implemented service. For example, a follower of an organizer can automatically receive information associated with a live event that the organizer has scheduled. In some examples, the number of followers that the organizer has can be received from one or more computer-implemented services. In some examples, if the number of followers exceeds a threshold number of followers, the organizer score can be set to a maximum value, e.g., 1. In some examples, if the number of followers does not exceed the threshold number of followers, the organizer score can be set to a minimum value, e.g., 0. In some examples, the organizer score can be set to a value between the minimum value and the maximum value based on the number of followers that the organizer.

In some implementations, the organizer score can be provided based on the number of quality live events and the number of followers. For example, a first score can be determined based on the number of quality live events, and a second score can be determined based on the number of followers. In some examples, the organizer score can be provided based on the first score and the second score. For example, the organizer score can be an average of the first score and the second score. As another example, the organizer score can be a weighted average of the first score and the second score, where respective weights are applied to the first score and the second score.

In some implementations, an entity score is specific to an entity associated with the live event. As described above, example entities include people, brands, companies, universities, colleges, non-profit organizations, and governmental agencies. In some examples, the entity score indicates a degree of popularity of a respective entity. For example, an entity score can be provided based on a number of queries received, e.g., by a search system, that explicitly include a respective entity, and/or are associated with the respective entity. As another example, an entity score can be provided based on a number of times a respective entity is explicitly referenced in and/or is associated with posts distributed through one or more social networking services. In some implementations, entity scores are received from an entity score index. For example, one or more computer-implemented services can determine entity scores and store the entity scores in an entity score index.

In some implementations, a description score is provided based on the description, if any, associated with the event. In some examples, the description score is determined based on a length of the description. For example, length can be provided as a word count. In some examples, the word count is determined as the number of words included in the description. In some examples, the word count only includes the number of unique words provided in the description. For example, if a word appears multiple times in the description, the word is only counted once. In some examples, the word count excludes stop words. For example, one or more stop words can be filtered from the description before the word count is determined. Example stop words can include "the," "is," "it," "are," "a," and "an."

In some implementations, the word count is compared to one or more threshold word counts. In some examples, if the word count exceeds a threshold word count, the description score can be set equal to a maximum value, e.g., 1. In some examples, if the word count does not exceed the threshold word count, the description score can be set equal to a maximum value, e.g., 0. In this manner, descriptions that are relatively short can be assigned a lower score than descriptions that are relatively long. In some examples, a description that is too long may also result in a lower description score. For example, the word count can be compared to a first threshold word count and a second threshold word count. If the word count exceeds the second threshold word count, and does not exceed the first threshold word, the description score is set equal to the maximum value. If the word count exceeds the first threshold word count, or does not exceed the second threshold word count, the description score is set equal to the minimum value.

In some implementations, a set of live events is provided based on the quality scores of live events in the superset of live events. In some examples, the quality score of a live event of the superset of live events is compared to a threshold quality score. In some examples, if the quality score exceeds the threshold quality score, the live event is included in the set of live events. In some examples, if the quality score does not exceed the threshold quality score, the live event is not included in the set of live events. In this manner, the set of live events can be described as a subset of the superset of live events. In some examples, the set of live events can include the same live events as the superset of live events. For example, if the quality scores of all events in the superset of live events exceed the threshold quality score, all events in the superset of live events are also included in the set of live events.

In accordance with implementations of the present disclosure, live events in the set of live events are stored in a live event datastore, e.g., the live event datastore 132 of FIG. 1. In some examples, event data associated with each live event is also stored in the live event datastore. In some implementations, the live event datastore includes live events that can be selectively surfaced in search results in response to a query.

In accordance with implementations of the present disclosure, one or more live event search results are selectively provided in search results in response to a query. In some implementations, a query is received and a set of entities associated with the query are provided. In some examples, the set of entities includes one or more entities. In some examples, the one or more entities associated with the query are provided form a query table that maps queries to one or more entities. In some examples, the query is provided to an entity annotator that selects one or more entities from an entity graph, and returns the one or more entities.

In some implementations, the one or more entities in the set of entities associated with the query are compared to entities in the sets of entities associated with the live events stored in the live event datastore. In some examples, if at least one entity associated with the query matches an entity associated with the live event, the live event is determined to be an eligible live event, e.g., eligible to be surfaced in search results. In some examples, at least one entity associated with the query can match entities associated with two or more live events. Consequently, the two or more live events are determined to be eligible live events, e.g., eligible to be surfaced in search results. Accordingly, eligible live events include live events that have been determined to be responsive to the query.

In some implementations, it is determined whether a fact summary is to be displayed in search results in response to the query. In some examples, the fact summary corresponds to the at least one entity associated with the query that matches an entity associated with a live event. In some examples, if a fact summary is to be displayed, live events can be displayed in search results. In some examples, if a fact summary is not to be displayed, live events are not to be displayed in search results.

In some examples, a fact summary can be provided for queries that have been determined to reference a particular entity, such as a person, place, country, landmark, animal, historical event, organization, business, sports team, sporting event, movie, song, album, game, work of art, or any other entity. For example, it can be determined that a fact summary is to be displayed for an entity associated with the query. In response, the fact summary can be triggered for display.

In general, a fact summary for a particular entity can include content related to the particular entity. In some implementations, a fact summary includes a set of factual information deemed relevant to the particular entity. For example, a fact summary for an actor may include biographical information for the actor, as well as content associated with movies or television shows that the actor has appeared. In some implementations, the fact summary includes a summary of information related to the particular entity. For example, a fact summary for a nation may include a map of the nation, the flag of the nation, the official language of the nation, and/or other facts and content related to the nation. In some examples, information provided in the fact summary can be pulled from one or more resources, e.g., web pages, and can be merged to populate the fact summary.

In some implementations, whether an eligible live event is actually to be surfaced in search results is determined based on a time associated with the eligible live event. In some examples, if the eligible live event is scheduled too far into the future, relative to when the query was sent or received, the eligible live event is not surfaced in search results. In some examples, if the eligible live event is not scheduled too far into the future, relative to when the query was sent or received, the eligible live event is surfaced in search results. In some examples, if the eligible live event is currently occurring, e.g., when the query was sent or received, the eligible live event is surfaced in search results. In some examples, if the eligible live event complete, the eligible live event is not surfaced in search results.

In some implementations, a time difference is determined for each eligible live event in the set of eligible live events. In some examples, the time difference is determined based on the time, at which the query was sent or received, and the time, at which the respective live event is scheduled to occur. In some examples, the time, at which the respective live event is scheduled to occur accounts for days, hours, minutes and seconds. In some examples, the time difference is provided in seconds. The time difference is positive, if the live event is scheduled to occur in the future, is zero if the live event begins at approximately the same time that the query was sent or received, and is negative if the live event is occurring, or has already occurred.

In some implementations, the time difference is compared to one or more time difference thresholds. In some examples, if the time difference exceeds a time difference threshold, the respective eligible live event is not surfaced in search results. In some examples, if the time difference does not exceed the time difference threshold, the respective eligible live event can be surfaced in search results. In some examples, a set of to be surfaced live events is provided, and includes one or more eligible live events having respective time differences that do not exceed the threshold time difference.

In some implementations, a time difference threshold can be provided based on a query. In some examples, an intent of the query is determined, and the time difference threshold is based on the intent. In some examples, the intent of the query reflects the user's intent in submitting the query. Example intents can include a general intent and a specific intent. In some examples, a general intent indicates that the user submitted the query for general information about one or more terms of the query. For example, the example query [state of the union] can be associated with a general intent, e.g., the user may be looking for general information. In some examples, a specific intent indicates that the user submitted the query for specific information about one or more terms of the query. For example, the example query [live stream state of the union] can be associated with a specific intent, e.g., the user is looking for a resource to watch the state of the union live. In some implementations, if the intent is determined to be a specific intent, the time difference threshold is set to a first value, and if the intent is determined to be something other than a specific intent, e.g., a general intent, the time difference threshold is set to a second value that is less than the first value. In this manner, live events that are to occur further into the future can be surfaced in search results in response to a specific intent, but not be surfaced in search results in response to an intent that is not a specific intent.

In some implementations, the intent of the query can be determined based on one or more query patterns. In some examples, a query pattern includes a pattern of one or more terms included in a query. Each query pattern can be associated with a respective intent. In some examples, the query is compared to one or more query patterns and, if the query matches a query pattern, the intent associated with the query pattern is selected. For example, example query patterns can include [watch live *], [* watch live] and [watch * live], where * indicates a wildcard, that are each associated with a specific intent. The example query [watch state of the union live] can be determined to match the query pattern [watch * live], and, consequently, it can be determined that the query is associated with a specific intent.

As described above, a set of to be surfaced live events is provided, and includes one or more eligible live events having respective time differences that do not exceed the threshold time difference. In some examples, each live event in the set of to be surface live events is surfaced in search results. An event search result is provided for each live event in the set of to be surfaced live events, the event search result providing a graphical representation of the respective live event. In some examples, the event search result includes event data. For example, the event search result can include a title and a description of the live event. In some examples, the event search result includes the URL to enable the user to select the URL and navigate to the resource that is publishing the live event. In some examples, the event search result includes a time indicator that indicates a time until the live event begins, or whether the live event is currently occurring. In some examples, the time indicator is provided based on the time difference determined for the respective live event.

Figure 2:
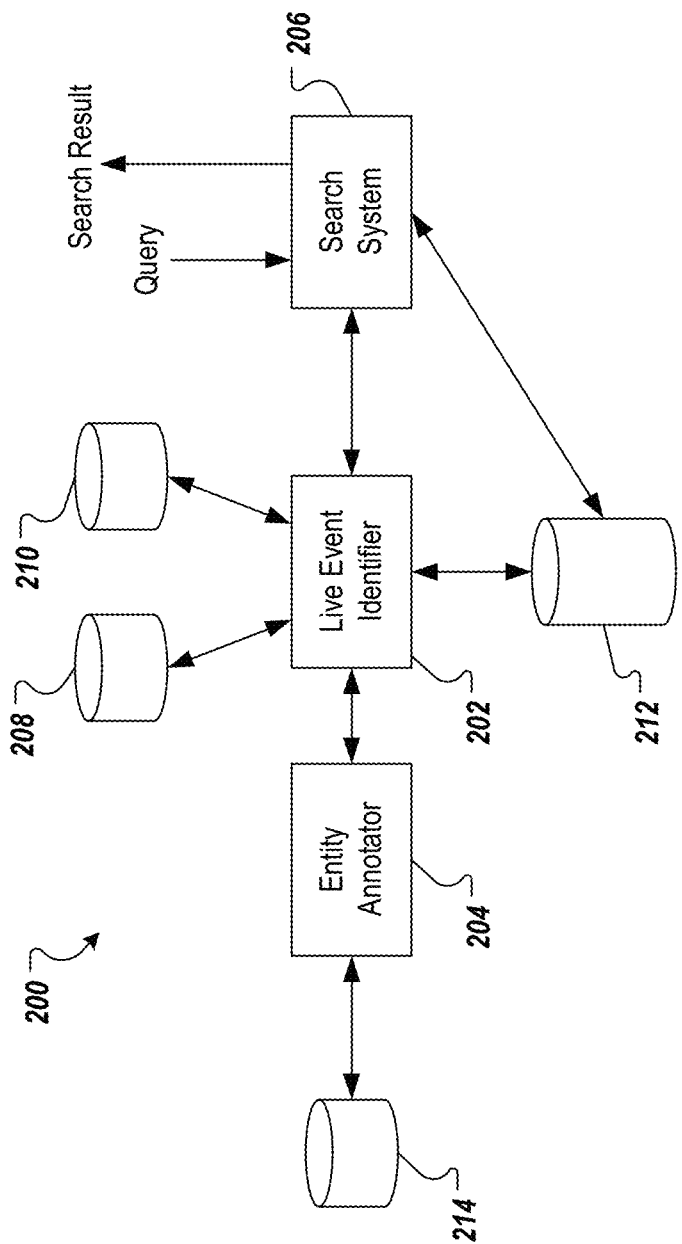
FIG. 2 depicts an example environment for identifying live events.

FIG. 2 depicts an example environment 200 for identifying live events. The example environment 200 includes a live event identifier 202, an entity annotator 204, and a search system 206. In some examples, the search system 206 corresponds to the search system 120 of FIG. 1. In some examples, the live event identifier 202, the entity annotator 204 and the search system 206 can each be provided as one or more computer-executable programs executed by one or more computing devices.

In some implementations, the live event identifier 202 receives event data for live events from one or more data sources 208, 210. In some examples, each data source 208, 210 is specific to a computer-implemented service. For example, the data source 208 can be associated with a video sharing service, and can include event data for live events that are scheduled for the video sharing service. As another example, the data source 208 can be associated with a social networking service, and can include event data for live events that are scheduled for the social networking service. In some examples, the live events provided from the data sources 208, 210 are included in a superset of live events. In some examples, live events of the superset of live events are processed by the live event identifier 202 to provide the set of live events. In some examples, event data associated with the set of live events is stored in a data store 212.

In some implementations, the live event identifier 202 identifies live events to be included in the set of live events as described herein. For example, the live event identifier 202 determines a quality score for each live event in the superset of live events, as described herein. In some examples, the live event identifier 202 can request and receive data from one or more data sources that can be used in calculating the quality scores. For example, the live event identifier 202 can request and receive sets of entities from the entity annotator 204. For example, the entity annotator 204 can receive entity data associated with a live event, e.g., from the live event identifier, and selects one or more entities from an entity graph, and provide a set of entities associated with the live event to the live event identifier 202. As another example, the entity annotator 204 can receive entity data associated with a live event from a data source 214. As another example, the live event identifier 202 can request and receive entity scores and from an entity score index (not shown). As another example, the live event identifier 202 can request and receive data associated with event organizers, e.g., follower data, from the one or more data sources 208, 210, for example.

In some implementations, the search system 206 selectively surfaces live events in search results, as described herein. In some examples, the search system 206 receives a query and determined whether live event search results are to be displayed in response to the query. For example, the search system 206 can provide the set of eligible live events based on entities associated with the query and entities associated with respective live events, can determine a time difference for respective live events, and can determined whether a live event is to be included in search results based on the time difference.

Figure 3:
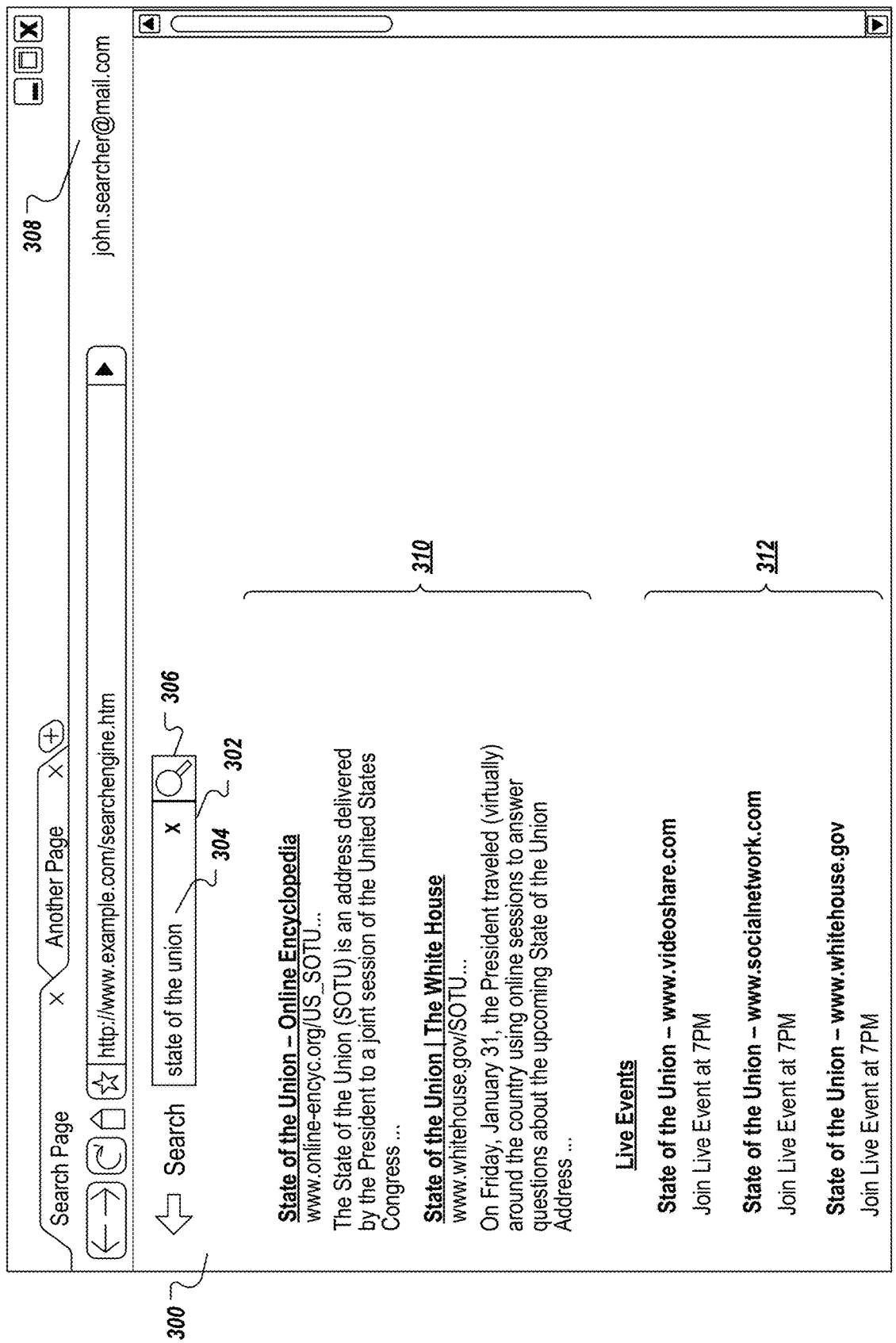
FIG. 3 depicts an example search results page including live events.

FIG. 3 depicts an example search results page 300 including live events. Although the example search results page 300 is depicted inside a web browser, this is for context only and is not intended to limit the scope of the present disclosure to any one web browser or even to implementations involving serving a web page. The illustrated search results page 300 includes a search box 302, a search query 304, a search button 306, user information 308, general search results 310, and in-depth article search results 312.

In the depicted example, the search query 304 is provided as [state of the union]. In response to the query 306, the general search results 310 are displayed, and the live event search results 312 are displayed. The general search results 310 represent resources that are responsive to the query, e.g., a web page published on an encyclopedic web site that generally describes the state of the union address. The live event search results 312 represent live events that are responsive to the query.

Figure 4:
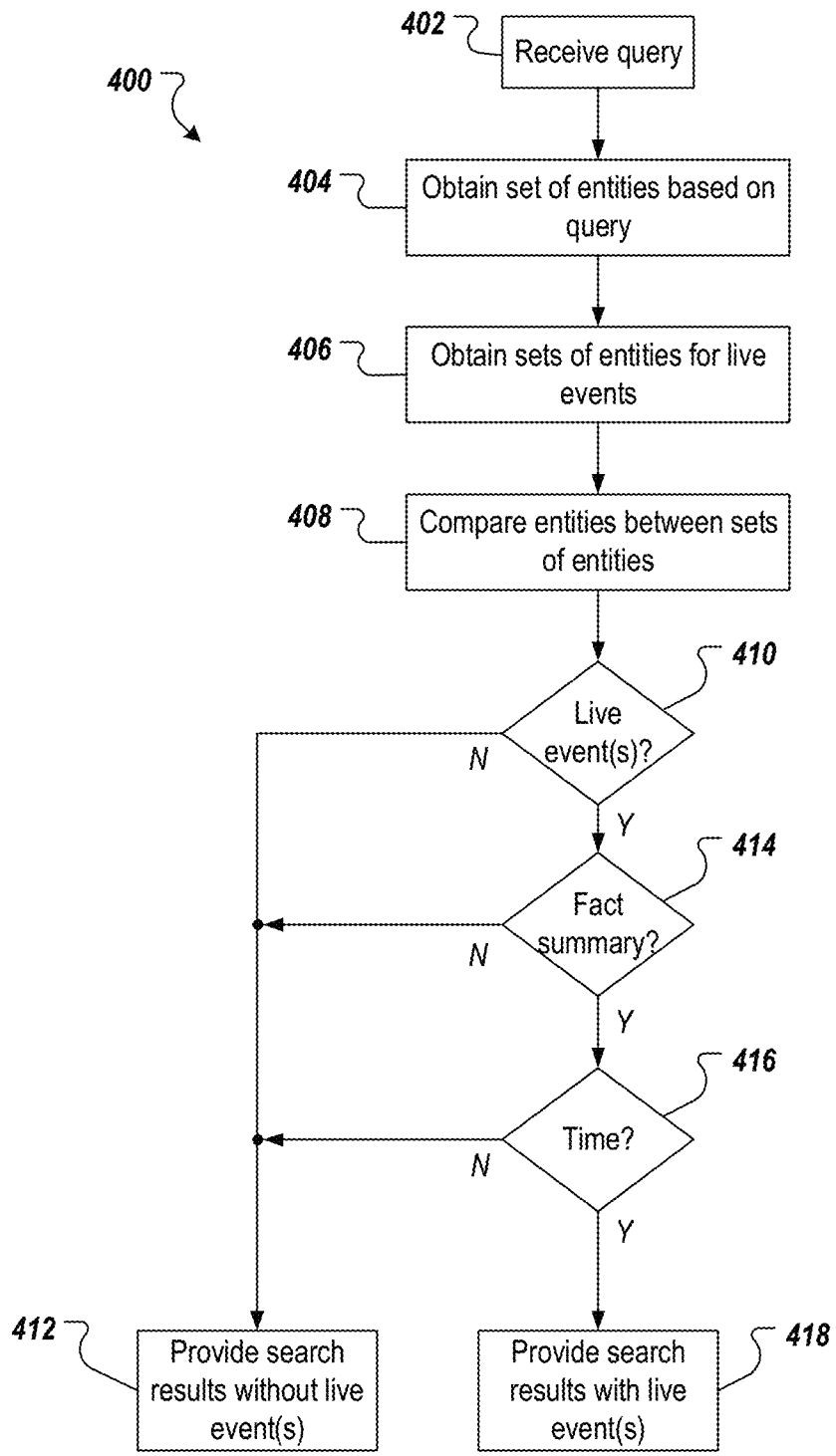
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example environment 100 of FIG. 1, e.g., the search system 120 and/or the live system 130. In some examples, the example process 400 can be provided by one or more computer-executable programs executed using one or more computing devices. The example process 400 can be performed to selectively surface live events in search results.

A query is received (402). For example, the search system 120 of FIG. 1 receives a query. A set of entities associated with the query is obtained (404). For example, the set of entities can be requested and received from a query table, as described herein. Sets of entities associated with live events are obtained (406). For example, a set of entities associated with respective live events can be provided from a live event data store, e.g., the live event data store 132 of FIG. 1, the live event data store 212. Entities are compared between the set of entities associated with the queries and each of the sets of entities associated with the live events (408).

It is determined whether one or more live events are responsive to the query (410). For example, it can be determined whether at least one entity associated with the query matches an entity of one or more of the live events based on the comparing. In some examples, a set of eligible live events is provided and includes live event shaving an entity that matches an entity associated with the query. In some examples, if at least one entity associated with the query does not match an entity of one or more of the live events, it is determined that no live events are responsive to the query, and search results are provided without live events (412). In some examples, if at least one entity associated with the query matches an entity of one or more of the live events, it is determined whether a fact summary is to be displayed (414). In some examples, if a fact summary is not to be displayed, search results are provided without live events (412). In some examples, if a fact summary is to be displayed, it is determined whether time differences associated with respective live events exceed a time difference threshold (416). In some examples, if the time differences of all of the live events in the set of eligible live events exceed the time difference threshold, search results are provided without live events (412). In some examples, if the time difference of a live event in the set of eligible live does not exceed the time difference threshold, the live event is included in a set of to be surfaced live events. Search results with one or more live events are provided (418). For example, the search results can include one or more live event search results, each live event search result being a graphical representation of a respective live event in the set of to be surfaced live events.

Figure 5:
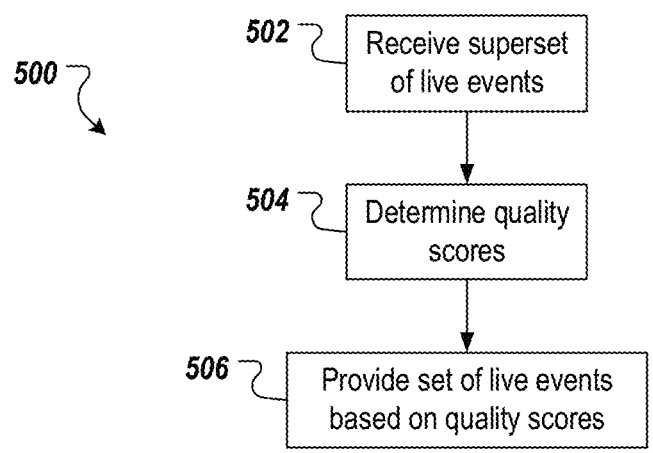
FIG. 5 depicts an example process that can be executed in accordance with implementations of the present disclosure.

FIG. 5 depicts an example process 500 that can be executed in accordance with implementations of the present disclosure. The example process 500 can be implemented, for example, by the example environment 100 of FIG. 1, e.g., the search system 120 and/or the live event system 130. In some examples, the example process 500 can be provided by one or more computer-executable programs executed using one or more computing devices. The example process 500 can be performed to identify one or more live events that can be surfaced in search results.

A superset of live events is obtained (502). For example, one or more live events from each of a plurality of data sources is received and are included in the superset of live events. In some examples, event data associated with each of the live events in the superset of live events is received, e.g., from the data sources. A quality score is determined for each live event in the superset of live events (504). For example, a quality score is determined based on one or more of an organizer score, one or more entity scores, and a description score, as described herein. A set of live events is provided based on respective quality scores (506). For example, the quality score of a live event of the superset of live events is compared to a threshold quality score. In some examples, if the quality score exceeds the threshold quality score, the live event is included in the set of live events. In some examples, if the quality score does not exceed the threshold quality score, the live event is not included in the set of live events. In this manner, the set of live events can be described as a subset of the superset of live events. In some examples, the set of live events can include the same live events as the superset of live events. For example, if the quality scores of all events in the superset of live events exceed the threshold quality score, all events in the superset of live events are also included in the set of live events.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for surfacing live event search results, the method comprising:
   receiving, by one or more processors, a request for live event search results;
   comparing, by the one or more processors and in response to the receiving of the request, at least one entity of a set of entities to each live event of one or more live events from a live event data store, wherein each live event of the one or more live events comprises a graphical representation of the live event, a description of the live event, and an organizer of the live event;
   determining, by the one or more processors and based on the comparison, that a fact summary of the live event is to be displayed;
   generating, by the one or more processors and in response to the determining that the fact summary of the live event is to be displayed, one or more search results, wherein each search result of the one or more search results corresponds to a live event of the one or more live events, and wherein each search result comprises the graphical representation of the live event, the description of the live event, and the organizer of the live event; and providing, by the one or more processors and in response to the generating of the one or more search results based on the fact summary, the one or more search results for display.

2. The computer-implemented method of claim 1, wherein receiving the request comprises receiving a query.

3. The computer-implemented method of claim 2, wherein receiving the request comprises obtaining the set of entities associated with the query.

4. The computer-implemented method of claim 3, wherein the set of entities are associated with at least one live event of the one or more live events.

5. The computer-implemented method of claim 3, wherein any of the at least one entity comprises an individual or an organization, and wherein comparing, by the one or more processors, the at least one entity of the set of entities to each live event of the one or more live events comprises identifying, by the one or more processors, that any of the at least one entity of the set of entities corresponds to any of at least one other entity associated with any of the one or more live events.

6. The computer-implemented method of claim 5, wherein determining, by the one or more processors and based on the comparison, that the fact summary of the live event is to be displayed comprises determining, by the one or more processors and in response to the identifying that any of the at least one entity of the set of entities corresponds to any of at least one other entity associated with any of the one or more live events, that the fact summary of the live event is to be displayed.

7. The computer-implemented method of claim 6, wherein comparing, by the one or more processors, the at least one entity of the set of entities to each live event of the one or more live events comprises comparing, by the one or more processors, i) the at least one entity of the set of entities to each live event of the one or more live events, and ii) a quality score of each live event to a threshold quality score.

8. The computer-implemented method of claim 7, wherein the live event is identified as a member of the one or more live events when the quality score associated with the live event is greater than the threshold quality score.

9. The computer-implemented method of claim 1, wherein determining, by the one or more processors and based on the comparison, that the fact summary of the live event is to be displayed comprises determining, by the one or more processors and based on the comparison, that a relevance of a set of factual information in the fact summary to the at least one entity is above a threshold, and wherein providing, by the one or more processors, based on the fact summary and in response to the generating of the one or more search results, the one or more search results for display comprises providing, by the one or more processors and in response to the generating of the one or more search results based on the relevance of the set of factual information to the at least one entity being above the threshold, the one or more search results for display.

10. A computing system for surfacing live event search results, the computing system comprising:

one or more processors; and a non-transitory, computer-readable medium comprising instructions that, when executed by the one or more processors, cause the one or more processors to perform operations, the operations comprising:

receiving a request for live event search results;

comparing, in response to the receiving of the request, at least one entity of a set of entities to each live event of one or more live events from a live event data store, wherein each live event of the one or more live events comprises a graphical representation of the live event, a description of the live event, and an organizer of the live event;

determining, based on the comparison, that a fact summary of the live event is to be displayed;

generating, in response to the determining that the fact summary of the live event is to be displayed, one or more search results, wherein each search result of the one or more search results corresponds to a live event of the one or more live events, and wherein each search result comprises the graphical representation of the live event, the description of the live event, and the organizer of the live event; and providing, in response to the generating of the one or more search results based on the fact summary, the one or more search results for display.

11. The computing system of claim 10, wherein receiving the request comprises receiving a query.

12. The computing system of claim 11, wherein receiving the request comprises obtaining the set of entities associated with the query.

13. The computing system of claim 12, wherein the set of entities are associated with at least one live event of the one or more live events.

14. The computing system of claim 12, wherein any of the at least one entity comprises an individual or an organization, and wherein comparing the at least one entity of the set of entities to each live event of the one or more live events comprises identifying that any of the at least one entity of the set of entities corresponds to any of at least one other entity associated with any of the one or more live events.

15. The computing system of claim 14, wherein determining, based on the comparison, that the fact summary of the live event is to be displayed comprises determining, in response to the identifying that any of the at least one entity of the set of entities corresponds to any of at least one other entity associated with any of the one or more live events, that the fact summary of the live event is to be displayed.

16. The computing system of claim 10, wherein comparing the at least one entity of the set of entities to each live event of the one or more live events comprises comparing i) the at least one entity of the set of entities to each live event of the one or more live events, and ii) a quality score of each live event to a threshold quality score.

17. The computing system of claim 16, wherein the live event is identified as a member of the one or more live events when the quality score associated with the live event is greater than the threshold quality score.

18. A non-transitory, computer-readable medium comprising instructions that, when executed by one or more processors, cause the one or more processors to perform operations, the operations comprising:

receiving a request for live event search results;

comparing, in response to the receiving of the request, at least one entity of a set of entities to each live event of one or more live events from a live event data store, wherein each live event of the one or more live events comprises a graphical representation of the live event, a description of the live event, and an organizer of the live event;

determining, based on the comparison, that a fact summary of the live event is to be displayed;

generating, in response to the determining that the fact summary of the live event is to be displayed, one or more search results, wherein each search result of the one or more search results corresponds to a live event of the one or more live events, and wherein each search result comprises the graphical representation of the live event, the description of the live event, and the organizer of the live event; and providing, in response to the generating of the one or more search results based on the fact summary the one or more search results for display.

19. The non-transitory, computer-readable medium of claim 18, wherein comparing, by the one or more processors, the at least one entity of the set of entities to each live event of the one or more live events comprises comparing, by the one or more processors, i) the at least one entity of the set of entities to each live event of the one or more live events, and ii) a quality score of each live event to a threshold quality score.

20. The computing system of claim 19, wherein the live event is identified as a member of the one or more live events when the quality score associated with the live event is greater than the threshold quality score.

* * * * *